United States Patent
Ko et al.

(10) Patent No.: US 8,005,369 B2
(45) Date of Patent: Aug. 23, 2011

(54) APPARATUS FOR SYNCHRONIZING CLOCK IN REAL-TIME LOCATING SYSTEM AND METHOD THEREFOR

(75) Inventors: Kwang-Ho Ko, Daejeon (KR); Chang-Sub Shin, Daejeon (KR); Hyun Lee, Daejeon (KR); Won-Chul Choi, Chungbuk (KR); Woo-Yong Lee, Daejeon (KR); Choon-Sik Yim, Daejeon (KR); Cheol-Sig Pyo, Daejeon (KR); Jong-Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 82 days.

(21) Appl. No.: 12/085,767

(22) PCT Filed: Dec. 27, 2005

(86) PCT No.: PCT/KR2005/004569
§ 371 (c)(1),
(2), (4) Date: Sep. 18, 2009

(87) PCT Pub. No.: WO2007/064058
PCT Pub. Date: Jun. 7, 2007

(65) Prior Publication Data
US 2010/0034539 A1 Feb. 11, 2010

(30) Foreign Application Priority Data

Dec. 1, 2005 (KR) .................. 10-2005-0116562

(51) Int. Cl.
*H04B 10/00* (2006.01)

(52) U.S. Cl. ............. 398/154; 398/155; 398/161
(58) Field of Classification Search ............ 398/75, 398/98–102, 154–155, 161, 167.5
See application file for complete search history.

(56) References Cited

U.S. PATENT DOCUMENTS

| 6,424,264 B1 | 7/2002 | Giraldin et al. |
| 6,611,537 B1 * | 8/2003 | Edens et al. ............. 370/503 |

(Continued)

FOREIGN PATENT DOCUMENTS

| KR | 1996-009478 | 3/1996 |
| KR | 10-0140434 B1 | 3/1998 |
| KR | 10-2001-0064729 A | 7/2001 |
| KR | 10-2002-0012127 A | 2/2002 |

(Continued)

OTHER PUBLICATIONS

International Search Report mailed Jul. 10, 2006 and issued in corresponding International Patent Application PCT/KR2005/004569.

*Primary Examiner* — Dzung D Tran
(74) *Attorney, Agent, or Firm* — Staas & Halsey LLP

(57) ABSTRACT

A highly precise clock synchronization apparatus in a real-time locating system (RTLS), includes an optical transmitting/receiving unit for receiving a clock information frame from a clock synchronization server, converting the received clock information frame in series-parallel, and transmitting/receiving the clock information data and the clock information; an offset estimation unit for detecting a preamble signal and a clock information signal from the series-parallel converted clock information frame, calculating a phase difference value by comparing the detected preamble signal with the detected clock information signal, and outputting an offset value based on the calculated phase difference value; and a clock synchronization unit for updating a local clock value to a time of the clock synchronization server based on the offset value and the clock information frame.

9 Claims, 4 Drawing Sheets

U.S. PATENT DOCUMENTS

| | | |
|---|---|---|
| 6,714,121 B1 | 3/2004 | Moore |
| 6,774,797 B2 | 8/2004 | Freathy et al. |
| 2002/0032525 A1 | 3/2002 | Yoshikawa et al. |
| 2002/0163932 A1* | 11/2002 | Fischer et al. ............... 370/465 |
| 2003/0142803 A1 | 7/2003 | Freedman et al. |
| 2003/0156603 A1* | 8/2003 | Rakib et al. .................. 370/485 |
| 2005/0031097 A1* | 2/2005 | Rabenko et al. ........... 379/93.31 |
| 2005/0276255 A1* | 12/2005 | Aiello et al. ................. 370/348 |

FOREIGN PATENT DOCUMENTS

| | | |
|---|---|---|
| KR | 10-2002-0041129 A | 6/2002 |
| KR | 10-2003-0070612 A | 8/2003 |
| KR | 10-2004-0018926 A | 3/2004 |
| KR | 10-2004-0056474 A | 7/2004 |
| KR | 20-0379901 | 3/2005 |
| KR | 10-2005-0040136 A | 5/2005 |
| KR | 10-2005-0045058 A | 5/2005 |

* cited by examiner

FIG.4

[clock synchronization server frame]

| Preamble | Reader identifier | Timestamp | Offset | Propagation Delay |

FIG. 5

[clock synchronization client frame]

| Preamble | Reader identifier | Timestamp | Offset | Processing Delay |

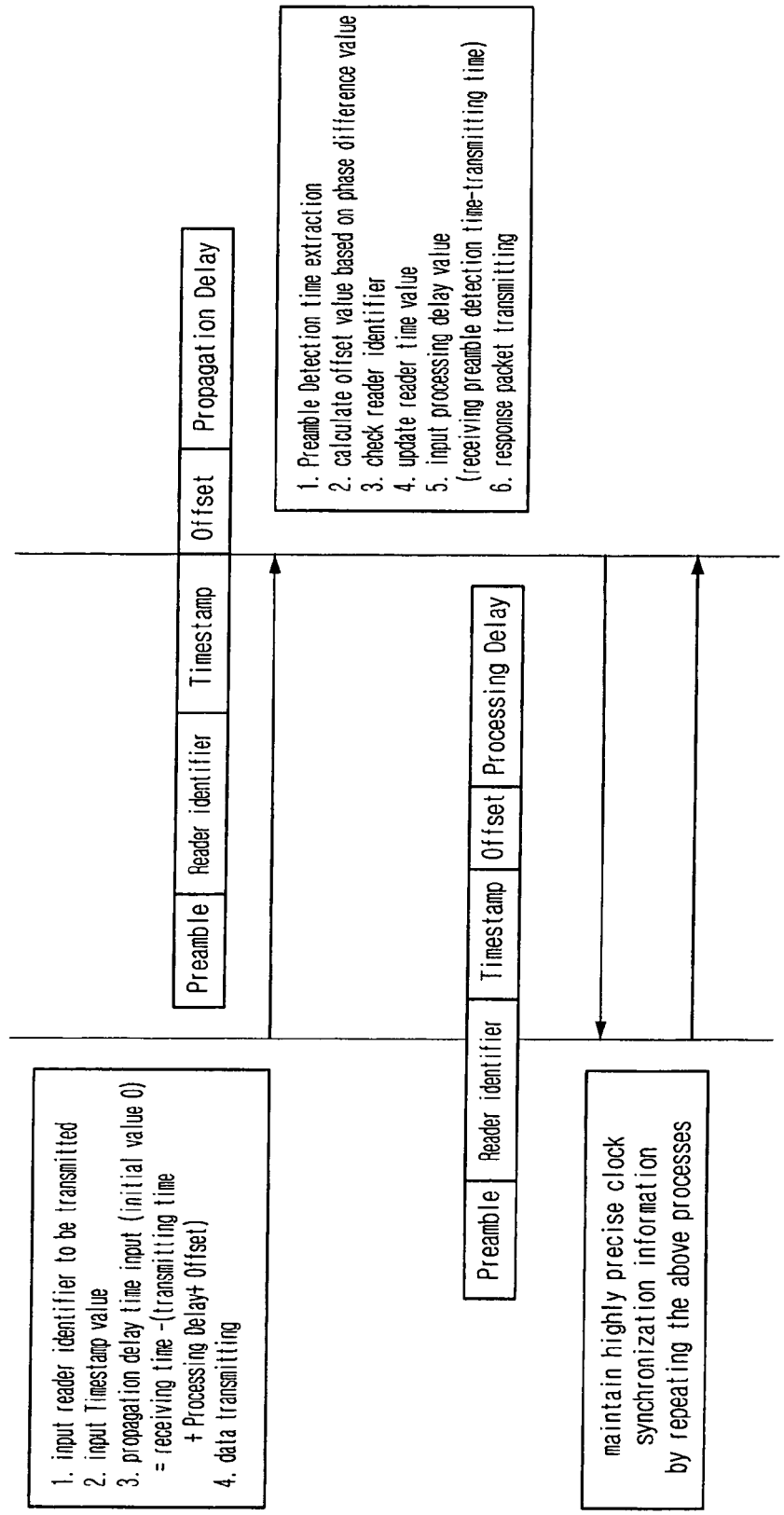

APPARATUS FOR SYNCHRONIZING CLOCK IN REAL-TIME LOCATING SYSTEM AND METHOD THEREFOR

This application claims the benefit under 35 U.S.C. Section 371, of PCT International Application Number PCT/KR2005/004569, filed Dec. 27, 2005, which claimed priority to Korean Application No. 10-2005-0116562, filed Dec. 1, 2005 in Republic of Korea, the contents of which are incorporated herein by reference.

TECHNICAL FIELD

The present invention relates to an apparatus for synchronizing a clock in a real-time locating system (RTLS) and a method therefor; and, more particularly, to an apparatus for synchronizing a clock in an RTLS and a method therefor, which perform a highly precise clock synchronization by receiving the time information from a clock synchronization server in real-time and measuring the precise location information of an RLTS transmitter at an RTLS receiver.

BACKGROUND ART

A real-time locating system (RTLS) is a system which checks the location of people or objects in real-time based on a specific technique using radio frequency identification (RFID) or a wireless LAN, and may be used in various fields.

In general, the RTLS technique includes an RTLS transmitter, e.g., an RFID tag which is attached to each object, and an RTLS receiver, e.g., an RFID reader which reads an identifier of the object having the RFID transmitter in a wireless communication. The RTLS technique provides a position service of an object by collecting, storing and processing the object information, and tracking the object. The RTLS receiver recognizes the position of the RTLS transmitter based on position information including intensity, a receiving time and a receiving direction of a signal transmitted from the RTLS transmitter.

However, although it is requested that a clock of the RTLS receiver is synchronized to a precise standard time in order to recognize the position of the RTLS transmitter, the clock synchronization technique is not provided within an error range of a nano-unit.

Accordingly, it is necessary to provide a method for synchronizing a clock into a highly precise standard time having an error range of a nano-unit through each reader which receives clock information from a clock synchronization server.

DISCLOSURE

Technical Problem

It is, therefore, an object of the present invention to provide to an apparatus for synchronizing a clock in an RTLS and a method therefor, which performs a highly precise clock synchronization so that a current time is updated to be a correct local time value within an error range of a nano-unit by receiving the clock information from a clock synchronization server in real-time and measuring the precise location information of an RLTS transmitter at an RTLS receiver.

The other objectives and advantages of the invention will be understood by the following description and will also be appreciated by the embodiments of the invention more clearly. Further, the objectives and advantages of the invention will readily be seen that they can be realized by the means and its combination specified in the claims.

Technical Solution

In accordance with an embodiment of the present invention, there is provided a highly precise clock synchronization apparatus in a real-time locating system (RTLS), including: an optical transmitting/receiving means for receiving a clock information frame from a clock synchronization server, converting the received clock information frame in serial-to-parallel, and transmitting/receiving the clock information data and the clock information; an offset estimation means for detecting a preamble signal and a clock information signal from the serial-to-parallel converted clock information frame, calculating a phase difference value by comparing the detected preamble signal with the detected clock information frame, and outputting an offset value based on the calculated phase difference value; and a clock synchronization means for updating a local clock value to a time of the clock synchronization server based on the offset value and the clock information frame.

In accordance with another embodiment of the present invention, there is provided a method for synchronizing a highly precise clock in a real-time locating system (RTLS), including the steps of: receiving a clock information frame from a clock synchronization server and checking the identifier information of the received frame; in case that the received frame is the frame to be received according to the checked result, detecting a preamble signal and a clock information signal from the received clock information frame, and calculating a phase difference value by comparing the detected preamble signal and the detected clock information signal; calculating an offset value based on the phase difference value; and updating a local clock value to a time of the clock synchronization server based on the offset value and the clock information frame.

In accordance with another embodiment of the present invention, there is provided a method for synchronizing a highly precise clock in a real-time locating system (RTLS), further including: calculating a processing delay value and transmitting a response packet frame as a response signal of a clock information frame including the offset value and the calculated processing delay value from the clock synchronization server.

Advantageous Effects

The present invention provides a simple and low cost hardware configuration by using a virtual offset value for a highly precise clock synchronization based on a phase difference value of a preamble signal.

In particular, the present invention may perform a highly precise clock synchronization on a nano-second basis within an error range of each RTLS receiver which receives the clock information from the clock synchronization server by providing a clock synchronization apparatus having an optical transmitting/receiving unit and an offset estimation unit.

DESCRIPTION OF DRAWINGS

FIGS. 4 and 5 illustrate frame structures of a clock synchronization in a highly precise clock synchronization apparatus of an RTLS in accordance with an embodiment of the present invention; and FIG. 6 shows a frame transmitting/receiving procedure between a clock synchronization server and a certain RTLS reader in a highly precise clock synchronization apparatus of an RTLS in accordance with an embodiment of the present invention.

BEST MODE FOR THE INVENTION

The above-mentioned objectives, features, and advantages will be more apparent by the following detailed description associated with the accompanying drawings, and thus, a person skilled in the art will easily carry out the present invention. Further, in the following description, well-known arts will not be described in detail if it appears that they could obscure the invention in unnecessary detail. Hereinafter, preferred embodiments of the present invention will be set forth in detail with reference to the accompanying drawings.

Figure 1:
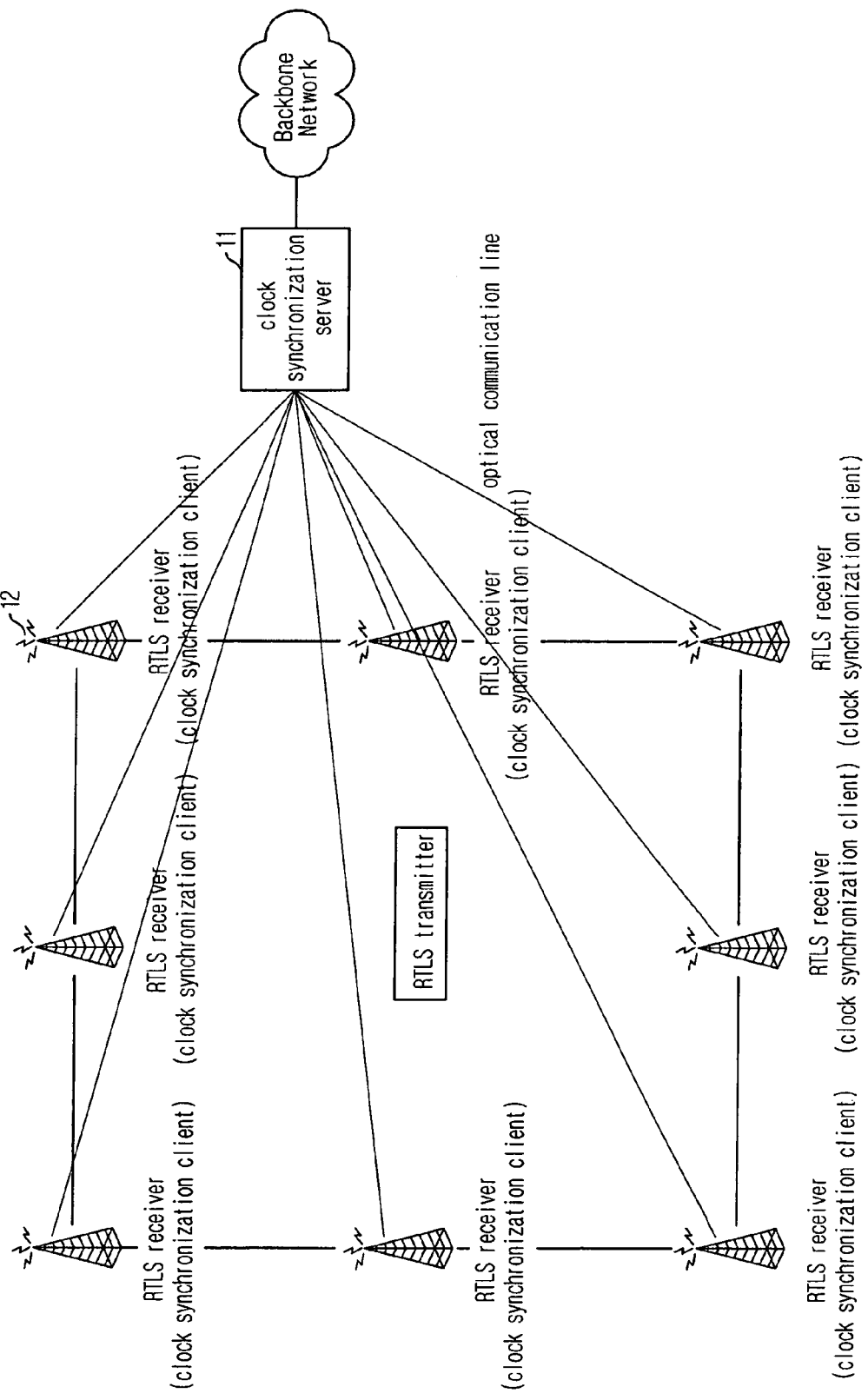
FIG. 1 illustrates a highly precise clock synchronization apparatus coupled to a clock synchronization server in an RTLS in accordance with an embodiment of the present invention.

FIG. 1 illustrates a highly precise clock synchronization apparatus coupled to a clock synchronization server in an RTLS in accordance with an embodiment of the present invention.

In the drawing, "11" denotes a clock synchronization server which provides the current standard clock information. "12" denotes a plurality of RTLS receivers which receive the standard clock information through a communication line and check a precise position of the RTLS transmitter based on the standard clock information.

As shown in FIG. 1, the RTLS in accordance with an embodiment of the present invention includes the clock synchronization server 11 and the plurality of RTLS receivers 12 coupled to the clock synchronization server 11. The clock synchronization server 11 transmits a clock information frame having preamble, an RTLS receiver identifier, a timestamp, an offset and a propagation delay to the plurality of RTLS receivers 12. The plurality of RTLS receivers 12 extract the preamble from the clock information frame received through the clock synchronization server 11, and calculates an offset value based on the preamble. The plurality of RTLS receivers 12 update a local clock value of the clock information frame to be a time of the clock synchronization server 11, and transmits a response packet frame including the preamble, the RTLS receiver identifier, the timestamp, the timestamp and the propagation delay to the clock synchronization server 11.

The clock synchronization server described above in an RTLS in accordance with an embodiment of the present invention will be described in detail.

Firstly, the clock synchronization server 11 transmits periodically clock information frame (clock synchronization server frame shown in FIG. 4a) to each RTLS receiver 12. The RTLS receiver 12 acquires clock information data and clock information from the clock information frame, and detects a preamble (header of each frame) signal. If the preamble signal is detected, the RTLS receiver 12 calculates an offset value based on a phase difference value between the current preamble signal and the previous preamble signal, and updates a precise network clock synchronization value.

The RTLS receiver 12 transmits a response packet frame (clock synchronization client frame shown in frame FIG. 4b) including the offset value and the clock information data to the clock synchronization server 11.

Figure 2:
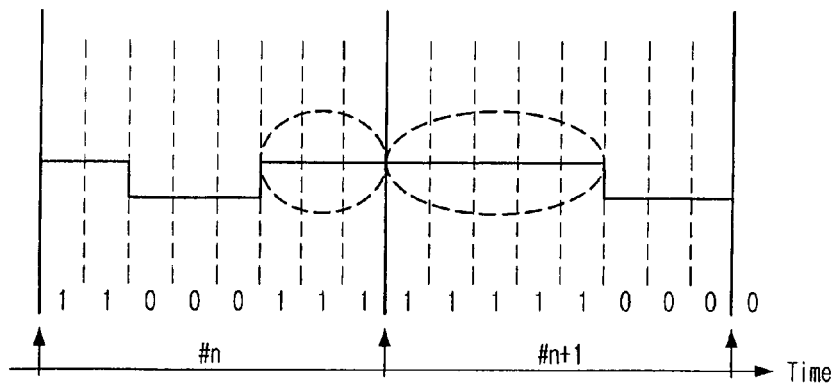
FIG. 2 illustrates an input signal and a sampling periodic signal received in an RTLS receiver in accordance with an embodiment of the present invention.

FIG. 2 illustrates an input signal and a sampling periodic signal received in an RTLS receiver in accordance with an embodiment of the present invention.

As shown in FIG. 2, the RTLS receiver 12 in the RTLS in accordance with an embodiment of the present invention detects a preamble signal and a clock information signal from the received frame by sampling the received signal according to a predetermined clock frequency through an offset estimation unit. The RTLS receiver 12 calculates a phase difference value by comparing the detected preamble signal with the detected clock information signal, and outputs an offset value based on the calculated phase difference value. Processing procedures of the input signal received in the RTLS receiver 12 are described as following.

1. processing an input signal in case of sampling of eight bits.

2. processing an input signal in case that a preamble value is 0xff.

3. detecting the preamble signal by comparing $(n+1)^{th}$ frame with $n^{th}$ frame at $n+1^{th}$ frame.

4. calculating an offset value at the sampling point after the detection.

5. performing a highly precise clock synchronization based on the calculated offset value.

Figure 3:
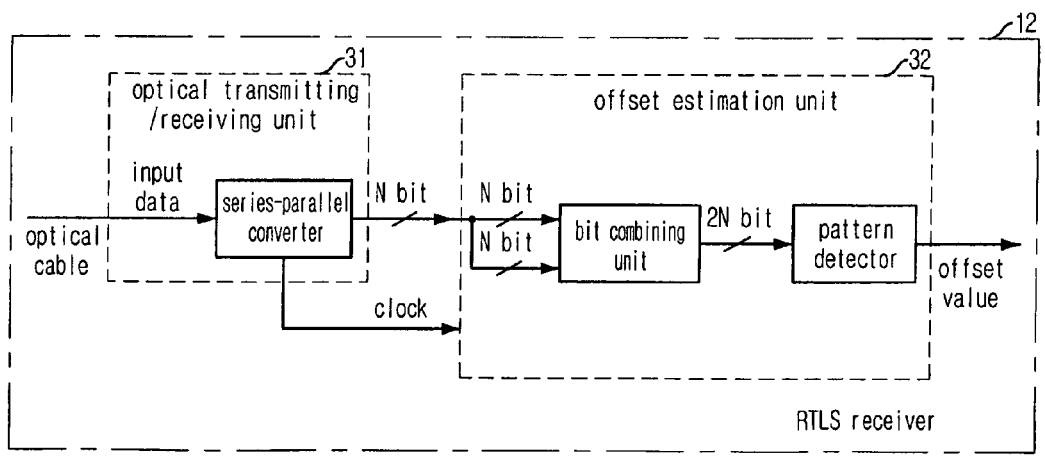
FIG. 3 illustrates a detailed diagram of a highly precise clock synchronization apparatus in an RTLS in accordance with an embodiment of the present invention.

FIG. 3 illustrates a detailed diagram of a highly precise clock synchronization apparatus (RTLS receiver) in an RTLS in accordance with an embodiment of the present invention.

As shown in FIG. 3, a highly precise clock synchronization apparatus (RTLS receiver) in an RTLS in accordance with the present invention includes an optical transmitting/receiving unit 31 for receiving a clock information frame from a clock synchronization server 11 through an optical cable, converting the received clock information frame in serial-to-parallel, and transmitting/receiving the clock information data and the clock information; an offset estimation unit 32 for detecting a preamble signal and a clock information signal from the serial-to-parallel converted clock information frame for calculating a phase difference value by comparing the detected preamble signal with the detected clock information signal, and outputting an offset value based on the calculated phase difference value; and a clock synchronization unit (not shown in FIG. 3) for updating a local clock value as a time of the clock synchronization server 11 based on the offset value and the clock information frame.

FIGS. 4 and 5 illustrate frame structures of clock synchronization in a highly precise clock synchronization apparatus of an RTLS in accordance with an embodiment of the present invention, and provide data for a highly precise clock synchronization based on a timestamp value, an offset value, and a propagation delay value.

As shown in FIGS. 4 and 5, FIG. 4 shows a clock synchronization server frame (namely, a clock synchronization frame) which includes the preamble, the RTLS receiver identifier, the timestamp, the offset and the propagation delay. FIG. 5 shows a clock synchronization client frame (namely, a response packet frame) which includes the preamble, the RTLS receiver identifier, the timestamp, the offset and the propagation delay.

FIG. 6 shows a frame transmitting/receiving procedure between a clock synchronization server and a certain RTLS reader in a highly precise clock synchronization apparatus of an RTLS in accordance with an embodiment of the present invention, and an equation for an important algorithm described in FIG. 6 is following.

A propagation delay time is expressed as:

Propagation delay time=receiving time−(transmitting time+processing delay+offset) [Equation 1]

As shown in the equation 1, an initial value of the propagation delay time is '0', and the receiving time is a response time for the frame transmitted to an RTLS reader. The processing delay and the offset are values received from the RTLS receiver 12, and the transmitting time is a time for transmitting the frame to the RTLS receiver 12.

Firstly, the clock synchronization server 11 transmits the clock information frame including the preamble, the RTLS receiver identifier, the timestamp, the offset (initial value '0') and the propagation delay to the RTLS receiver 12.

Next, the RTLS receiver 12 calculates the offset value based on a phase difference between signals received from the clock synchronization server 11 and checks identifier information from the received frame. In case that the received frame is the frame to be received, the RTLS receiver 12 updates a local clock value of the RTLS receiver 12 to a time of the clock synchronization server 11 based on the timestamp, the offset and the propagation delay value included in the frame, calculates a processing delay value, and transmits the clock synchronization client frame, which includes the offset value and the processing delay value shown in the FIG. 4b, to the clock synchronization server 11.

A processing delay is expressed as:

processing delay=receiving preamble detection time− transmitting time [Equation 2]

As shown in the equation 2, the "receiving preamble detection time" is a timestamp value while the preamble value received from the clock synchronization server 11 is detected, and the transmitting time is a time for transmitting a frame to the clock synchronization server 11.

The method of the present invention as mentioned above may be implemented by a software program and stored in a computer-readable storage medium such as CD-ROM, RAM, ROM, floppy disk, hard disk, optical magnetic disk, etc. This process may be readily carried out by those skilled in the art; and therefore, details of thereof are omitted here.

While the present invention has been described with respect to certain preferred embodiments, it will be apparent to those skilled in the art that various changes and modifications may be made without departing from the spirits and scope of the invention as defined in the following claims.

What is claimed is:

1. A highly precise clock synchronization apparatus in a real-time locating system (RTLS), comprising:
    an optical transmitter/receiver receiving a clock information frame from a clock synchronization server, converting the received clock information frame in serial-to-parallel, and transmitting/receiving the clock information data and the clock information;
    an offset estimator detecting a preamble signal and a clock information signal from the serial-to-parallel converted clock information frame, calculating a phase difference value by comparing the detected preamble signal with the detected clock information signal, and outputting an offset value based on the calculated phase difference value; and
    a clock synchronizer updating a local clock value to a time of the clock synchronization server based on the offset value and the clock information frame.

2. The apparatus as recited in claim 1, wherein the clock synchronization server transmits the clock information frame to the highly precise clock synchronization apparatus, and receives a response packet frame as a response signal of a clock information frame, the response packet frame including the offset value and a calculated processing delay value from the highly precise clock synchronization apparatus.

3. The apparatus as recited in claim 2, wherein the clock information frame and the response packet frame include a preamble, an RTLS receiver identifier, a timestamp, an offset and propagation delay information.

4. A highly precise clock synchronization apparatus in a real-time locating system (RTLS), comprising:
    an optical transmitting/receiving means for receiving a clock information frame from a clock synchronization server, converting the received clock information frame in serial-to-parallel, and transmitting/receiving the clock information data and the clock information;
    an offset estimation means for detecting a preamble signal and a clock information signal from the serial-to-parallel converted clock information frame, calculating a phase difference value by comparing the detected preamble signal with the detected clock information frame, and outputting an offset value based on the calculated phase difference value; and
    a clock synchronization means for updating a local clock value to a time of the clock synchronization server based on the offset value and the clock information frame,
    wherein the clock synchronization server transmits the clock information frame to the highly precise clock synchronization apparatus, and receives a response packet frame as a response signal of a clock information frame, the response packet frame including the offset value and a calculated processing delay value from the highly precise clock synchronization apparatus,
    wherein the clock information frame and the response packet frame include a preamble, an RTLS receiver identifier, a timestamp, an offset and propagation delay information, and
    wherein the propagation delay is expressed as:

Propagation delay time=receiving time—(transmitting time+processing delay+offset) [Equation 1]

where an initial value of the propagation delay time is '0', the receiving time is a response time for the frame transmitted to an RTLS reader, the processing delay and the offset are values received from the highly precise clock synchronization apparatus, and the transmitting time is a time which is used for transmitting the frame to the highly precise clock synchronization apparatus.

5. The apparatus as recited in claim 4, wherein the offset value is a value calculated based on a phase difference value between the preamble signal and the previous preamble signal.

6. The apparatus as recited in claim 5, wherein the processing delay is expressed as:

processing delay=receiving preamble detection time—transmitting time [Equation 2]

where the receiving preamble detection time is a timestamp value when the preamble value received from the clock synchronization server is detected, and the transmitting time is a time which is used for transmitting a frame to the clock synchronization server.

7. A method for synchronizing a highly precise clock in a real-time locating system (RTLS), comprising the steps of:

receiving a clock information frame from a clock synchronization server and checking the identifier information of the received clock information frame;

in case that the received clock information frame is the frame to be received according to the checked result, detecting a preamble signal and a clock information signal from the received clock information frame, and calculating a phase difference value by comparing the detected preamble signal and the detected clock information signal;

calculating an offset value based on the phase difference value; and updating a local clock value to a time of the clock synchronization server based on the offset value and the clock information frame.

8. The method as recited in claim 7, further comprising:

calculating a processing delay value and transmitting a response packet frame as a response signal of a clock information frame, the response packet frame including the offset value and the calculated processing delay value from the clock synchronization server.

9. The method as recited in claim 7, wherein the clock information frame and the response packet frame include a preamble, an RTLS receiver identifier, a timestamp, an offset and propagation delay information.

* * * * *